(12) United States Patent
Belov et al.

(10) Patent No.: US 7,350,193 B2
(45) Date of Patent: Mar. 25, 2008

(54) PROCEDURE INVOCATION IN AN INTEGRATED COMPUTING ENVIRONMENT HAVING BOTH COMPILED AND INTERPRETED CODE SEGMENTS

(75) Inventors: Alexander Belov, Saint-Petersburg (RU); Vladimir D. Ivanov, Saint-Petersburg (RU); Vitaly S. Kozlovsky, Saint-Petersburg (RU); Vladimir Krupsky, Saint-Petersburg (RU); Jyh-Han Lin, Parkland, FL (US)

(73) Assignee: Motorola, Inc., Schaumburg, IL (US)

( * ) Notice: Subject to any disclaimer, the term of this patent is extended or adjusted under 35 U.S.C. 154(b) by 588 days.

(21) Appl. No.: 10/955,432

(22) Filed: Sep. 30, 2004

(65) Prior Publication Data

US 2006/0070028 A1    Mar. 30, 2006

(51) Int. Cl.
*G06F 9/44* (2006.01)
(52) U.S. Cl. ..................................... 717/114
(58) Field of Classification Search ................. 717/114
See application file for complete search history.

(56) References Cited

U.S. PATENT DOCUMENTS

| 6,654,778 | B1 | 11/2003 | Blandy et al. | |
| 6,915,520 | B2* | 7/2005 | Sanchez, II | 719/315 |
| 2001/0012281 | A1* | 8/2001 | Hall et al. | 370/338 |
| 2002/0086702 | A1* | 7/2002 | Lai et al. | 455/556 |

FOREIGN PATENT DOCUMENTS

WO    WO 01/79997    10/2001

OTHER PUBLICATIONS

Angelo Corsaro and Corrado Santoro, "A C++ Native Interface for Interpreted JVMs", On The Move to Meaningful Internet Systems 2003: OTM 2003Workshops, Springer-Verlag Berlin Heidelberg, 2003.*
JNI++ Project, "JNI++ User Guide", http://belnet.dl.sourceforge.net/sourceforge/jnipp/uguide-0.4.pdf.zip, Jan. 29, 2002.*
Sheng Liang , "Java Native Interface: Programmer's Guide and Specification", Prentice Hall, Jun. 10, 1999.*
Peter van der Linden, "Just Java 2, Fifth Edition", Prentice Hall, Dec. 21, 2001.*
CODEMESH, "Junc++ion: the Cost-Effective Solution for Java-C++ Integration," 1-22, Dec. 2, 2002.

* cited by examiner

*Primary Examiner*—Wei Zhen
*Assistant Examiner*—Songwei Qian

(57) ABSTRACT

Software code sections can include at least one calling procedure (110) and a called procedure (140). The called procedure can include an interpreted code body (144). Execution of the interpreted code body can require the use of an associated interpreter. The software code sections can also include prologue (142) associated with the called procedure. The prologue can be invoked by the at least one calling procedure and can responsively actuate the interpreted code body causing programmatic actions defined within the interpreted code body to execute. Execution of the prologue does not require use of an interpreter. In one embodiment, the interpreted code body of the called procedure can execute upon a platform having an application binary interface (115). The prologue can actuate the interpreted code body according to specifications of the application binary interface.

15 Claims, 3 Drawing Sheets

PROCEDURE INVOCATION IN AN INTEGRATED COMPUTING ENVIRONMENT HAVING BOTH COMPILED AND INTERPRETED CODE SEGMENTS

BACKGROUND

1. Field of the Invention

The present invention relates to the field of software integration and, more particularly, to procedure invocation in an integrated computing environment having both compiled an interpreted code segments.

2. Description of the Related Art

Software engineers utilize many different programming languages, each having its own advantages and disadvantages. Categories of programming languages include compiled and interpreted languages. A compiled language requires a compiler program to turn programming code into an executable machine-language binary program. After compiling once, the program can continue to be run from its binary form without compiling again. Compiled languages/programs tend to be faster than interpreted languages, but are often more difficult to program than interpreted languages. Further, once compiled, the compiled program can run only upon a single hardware platform for which compiling occurred, thereby making it difficult to port an compiled program from one platform to another. Examples of compiled languages include C, C++, C#, COBOL, and FORTRAN.

An interpreted language converts programming code into a binary form automatically when the program is run. The binary form is executed by an interpreter designed for the computing device upon which the programming code is to execute. A "pure" interpreted language converts program code to a binary form automatically, each time the program code is executed. Most interpreted code can be easily ported from one computing platform to another because the interpreted code remains constant as different platform-specific interpreters can be used to execute the interpreted code upon each computing platform. Interpreted language can include a great many advantageous services relating to security, error checking, simplicity, and the like. Generally, interpreted languages tend to execute slower than compiled languages. Interpreted languages, however are often easier to program, test, and/or maintain than compiled languages. Examples of pure interpreted languages include BASIC, PERL, PYTHON, and REX.

A Pseudo-code (p-code) language is a type of interpreted language that is somewhat of a hybrid between a compiled language and a pure interpreted language. P-code programming code is not compiled into a machine executable form, but is instead placed in a binary form that requires an interpreter before the code is executable upon a computing device. Unlike "pure" interpreted languages, however, a p-code program does not have to be converted to a binary form each time the program is run. Instead, the first time a p-code program is run, the binary form of the program is saved. The saved form is retrieved and used for each additional execution. That is, a p-code language can convert code entered by a programmer into an intermediate representation, which the interpreter executes. Examples of p-code languages include JAVA, PYTHON, and REXX.

Software developers often desire to integrate code written in a compiled language with code written in an interpreted languages, thereby taking advantages of the strengths of each. For example, a software developer can want to rapidly construct a software application in a secure, platform independent manner using advantages of an interpreted language, like the JAVA programming language. This interpreted language, however, may not support platform dependent features needed for the application. The software developer can also desire to utilize a preexisting application or library written in a compiled language, like the C programming language. Another possibility is that a small portion of time-critical code within the software application can demand the efficiency of a lower-level programming language. Unfortunately, integrating code written in different languages and/or different types of languages can add complications and inefficiencies to the resulting integrated software application that rival the advantages of integrating code in such a manner.

Many interpreted languages provide a standardized interface for integrating "native" code with interpreted code for the interpreted language. Native code is code that has been compiled to processor-specific machine code also referred herein as compiled code. For example, the JAVA programming language provides the Java Native Interface (JNI) that permits code running inside a JAVA VIRTUAL MACHINE to interoperate with applications and libraries written in other programming languages, such as the C and C++ programming language. The standardized interface for interpreted languages, however, contain substantial overhead to assure that safeguards are in place to prevent native programs from having negative side effects upon the interpreted environment. Moreover, most standardized interfaces for native code do not permit these safeguards to be manipulated by developers. As a result, methods called using a native language interface of the interpreted language tend to suffer performance degradations, which often outweigh the advantages of using the interface. For example, the method calls from native code to within a JAVA VIRTUAL MACHINE that use the JNI interface are typically about 20 times slower than calls from one procedure within the JAVA VIRTUAL MACHINE to another.

Conventional integration techniques suggest the use of special wrappers and method specific control blocks as the best way to integrate code. Such techniques make calls between languages an element of predefined design. The wrappers add overhead to every call, thereby reducing efficiency of every wrapper compliant call, which may in itself overbalance the benefits in using multiple languages for an application. Additionally, software developers and maintainers must further learn the specifics of the wrapper, which increases the cost to create and maintain software.

Further, such a technique requires specialized software associated with the wrapper to be loaded and executed upon a hardware platform in which the wrapper-based integrated environment resides. This specialized software is generally written in a platform dependent fashion, limiting the portability of the resulting integrated application. The specialized software can also have an associated cost to a user of the software, which many users may be unwilling to incur.

SUMMARY OF THE INVENTION

The present invention details a method, apparatus, and system for invoking procedures in an integrated environment having both compiled and interpreted code segments. A prologue can be written for each called procedure that can be used by a corresponding calling procedure to invoke the associated called procedure indirectly. The prologue can be written in a compiled language. The prologue can include code necessary to initialize the environment in which the called procedure is to execute. Because the prologue is specifically written for the associated procedure, unwanted overhead checks can be eliminated.

Accordingly, invoking procedures using the prologue can result in efficient runtime performance and a minimum of computing resources being consumed. For example, invoking a called procedure in a virtual machine from a calling procedure in the same virtual machine using a compiled prologue connected to the virtual machine via an application binary interface (ABI) can occur with approximately the same calling time as invoking the called procedure using methods local to the virtual machine. That is, no significant delays result from invoking the called procedure via the prologue as opposed to direct invocation from a Virtual Machine procedure.

One advantage of using a prologue is that the prologue can be used as a means for adding a layer of abstraction to procedure invocation. That is, a calling procedure invoking a called procedure via an associated prologue, need not know the language in which the called procedure is written. Further, the called procedure need not be aware of the language from which the calling procedure invoked the called procedure. This layer of abstraction can leverage a pre-existing code base for integrated software application projects, can permit standards-based integration of interpreted code and compiled code without wrappers, and can be implemented with great efficiency.

For example, called procedures can be expediently written in an interpreted language. After an integrated application is initially operational, its execution can be examined, and speed-essential procedures can be rewritten in an efficient manner in a compiled language. The ability to optimize procedures for speed and/or consumption of computing resources can be especially significant for applications written in a real-time fashion and for applications that operate upon a resource limited platform, such as mobile telephone devices, handheld devices, embedded devices, and the like.

In another example, an integrated program can be quickly written based upon pre-existing code libraries, and can be replaced piecemeal in a time-permitting fashion, by more elaborate and/or flexible routines that permit the better integration of new technologies. The replacement procedures can be written in object oriented, and/or other mainstream software language. Further, the proposed use of prologues permit the easy integration of software, thereby allowing an application to easily integrate third party software written in a platform agnostic manner. Accordingly, core application features unique to a device can be written in a platform specific proprietary manner, while non-critical features can be integrated easily within the application. For instance, interpreted language add-in, such as mobile device games and/or contact management routines written in JAVA, can be integrated into a proprietary application, such as an application executing upon a smart mobile telephone.

One aspect of the present invention can include a plurality of software code sections, which include at least one calling procedure and a called procedure. The called procedure can include an interpreted code body. Execution of the interpreted code body can require the use of an associated interpreter. The software code sections can also include prologue associated with the called procedure. The prologue can be invoked by the at least one calling procedure and can responsively actuate the interpreted code body causing programmatic actions defined within the interpreted code body to execute. Execution of the prologue does not require use of an interpreter. In one embodiment, the interpreted code body of the called procedure can execute upon a platform having an application binary interface. The prologue can actuate the interpreted code body according to specifications of the application binary interface.

Still another aspect of the present invention can include a method for calling an interpreted procedure. The method can invoke a compiled prologue associated with the interpreted procedure. The compiled prologue can perform at least one overhead action. The overhead action can be an action specified within an application binary interface associated with the platform upon which the interpreted procedure executes. The application binary interface can specify that the at least one overhead action is a necessary precursor to calling the interpreted procedure. Notably, the application binary interface only specifies calling specifics for machine (compiled) code. In one embodiment, the compiled prologue can perform overhead actions for an interpreted language as defined by the interpreted language's specification. Examples of overhead actions a synchronization action, an error handling setup action, further error processing, and the like.

Yet another aspect of present invention includes a machine-readable storage having stored thereon, a computer program having a plurality of code sections, the code sections executable by a machine. The code sections causing the machine to call a compiled program from within a virtual machine using a native program calling technique. At least one programmatic action can execute outside the virtual machine as a result of the call. A procedure can be invoked within the virtual machine responsive to the at least one programmatic action. Before invoking the procedure, the programmatic action can alter environment settings within the virtual machine to place the virtual machine in a state that permits the procedure to execute. The programmatic action can invoke the procedures and alter environmental settings via an application binary interface of the virtual machine.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate and explain various embodiments in accordance with the present invention; it being understood, however, that the invention is not limited to the precise arrangements and instrumentalities shown.

DETAILED DESCRIPTION OF THE INVENTION

Figure 1:
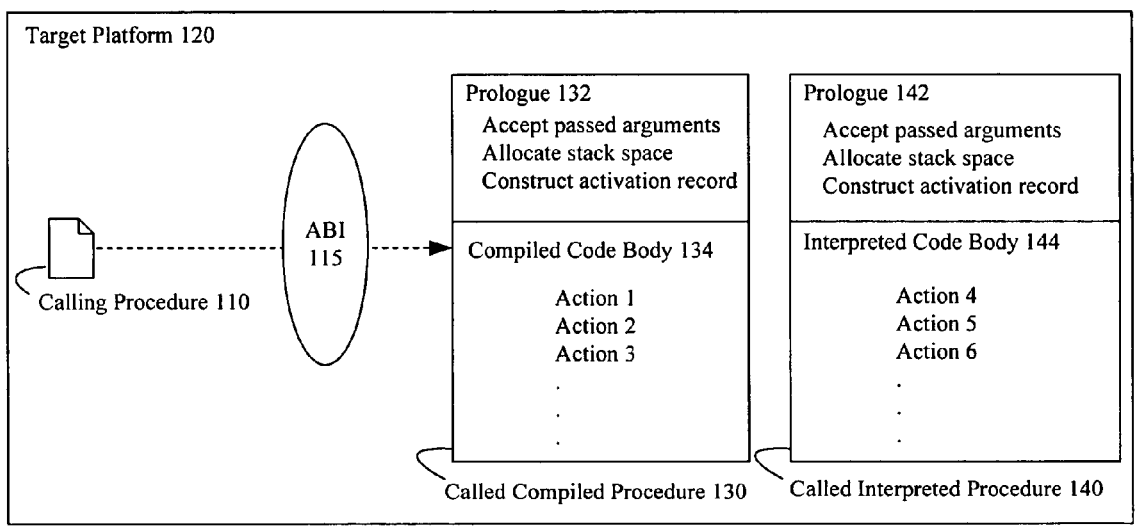
FIG. 1 is a schematic diagram of a system for calling an interpreted procedure executing upon a target platform using a compiled prologue that conforms to an application binary interface for the target platform in accordance with an embodiment of the inventive arrangements disclosed herein.

FIG. 1 is a schematic diagram of a system 100 for calling an interpreted procedure executing upon a target platform using a compiled prologue that conforms to an application binary interface for the target platform in accordance with an embodiment of the inventive arrangements disclosed herein.

The system 100 includes a target platform 120 that can represent the underlying computing environment or architecture upon which software, such as procedures 110, 130, and 140, run. The platform 120, which can represent a combination of hardware and operating system forming an application environment, is often referred to by a shorthand that indicates the operating system and processor of the platform, such as a Linux i386 platform, a Linux 64 platform, a PPC platform, a PALM ARM platform, and the like.

The target platform 120 can have an associated application binary interface (ABI) 115. ABI 115 can specify the calling conventions for the target platform 120 on which a called procedure 130 or 140 is to execute. The ABI 115 can specify such aspects of procedure invocation as the registers used for passing parameters, parameters to be passed upon a stack, method to construct a stack frame of the invoked procedures, aspects that relate to returning from executing the called procedure, and the like. Since calling conventions can be unique to a particular platform, different ABI's exist for each new platform. For example, the ABI 115 could be (depending on the target platform 120) a Windows/i386 ABI, a Linux/i386 ABI, Embedded ABI on a Motorola PowerPC (EABI), ATPCS (the ARM-THUMB procedure call standard), etc.

The called compiled procedure 130 can be a standard compiled procedure of target platform 120 that includes prologue 132 and compiled code body 134. The compiled code body 134 can be written in a high level compiled language and can perform designated programmatic actions, such as actions 1, 2, and 3. The prologue 132 takes care of the overhead actions that are required prior to execution of the compiled code body 134 to make the body 134 callable from some other procedure, like calling procedure 110. That is, the prologue 132 can be the execution starting point of the called compiled procedure 130 that is executed before the compiled code body.

The prologue 132 can perform a series of actions, which can be dependant upon calling conventions of the target platform 120, which are defined by ABI 115. Actions performed by the prologue 132 can include, but are not limited to, accepting arguments passed in the execution context of the called compiled procedure 130, allocating stack space required for procedure 130 execution, and constructing an activation record or stack frame for the procedure 130.

Unlike conventionally invoked interpreted procedures that do not have an associated prologue (notably prologues are not conventionally associated with interpreted procedures), the called interpreted procedure 140 can include compiled prologue 142 and interpreted code body 144. The interpreted code body 144 can be written in a high level interpreted or p-code language and can perform designated programmatic actions, such as actions 4, 5, and 6. Since interpreted code body 144 is written in an interpreted language, an interpreter (not shown) is utilized when performing actions 4, 5, and 6 based upon the interpreted code body 144. For example, when the target platform 120 is a JAVA platform, the interpreted code body 144 can include bytecodes of the called interpreted procedure 140.

The prologue 142 is a piece of generated machine code that allows invocation of the called interpreted procedure 140 in a manner that utilizes the same set of rules for procedure invocation as those used for invoking called compiled procedure 130, rules defined by ABI 115.

The prologue 142 performs actions for the called interpreted procedure 140 similar to those actions performed by prologue 132 for called compiled procedure 130. Specifically, actions performed by the prologue 142 can include, but are not limited to, accepting arguments passed in the execution context of the called interpreted procedure 140, allocating stack space required for procedure 140 execution, and constructing an activation record or stack frame for the procedure 140. After prologue 142 execution, execution control is passed to the interpreted code body 144 for execution using an associated interpreter.

The construction of the stack frame can provide access to a run-time environment of the interpreter associated with the procedure 140. For example, when the platform 120 is a JAVA platform, the construction can provide a JAVA interpreter with access to the JAVA runtime-environment, e.g. it can put a reference to JAVA (or some other suitable virtual machine) method or class description into the created stack frame that is accessible from the invoked procedure 140. Information of the prologue 142 can be statically defined since the reference needed by the prologue 142 can be known ahead of time as the prologue 142 is being constructed, which is before the prologue 142 is compiled into machine code.

It should be noted that prologue 132 and prologue 142 can be written in the same compiled language (compiled specifically for target platform 120). The calling procedure 110 can utilize the same methodology and technique for invoking the called compiled procedure 130 and called interpreted procedure 140 from calling procedure 110. That is, the language that the body 134 and 144 is written in can be transparent to the calling procedure 110. Therefore, the calling procedure 110 can be unaware of whether a called procedure is written in a compiled language like C or an interpreted language like JAVA, as such implementation concerns are abstracted from the calling procedure 110 when prologue 132 and prologue 142 are used to call the procedures 130 and 140, respectively. Further, the calling platform 105 can be either an interpreted platform, which can invoke procedures 130 and 140 using "native" invocation techniques, or a compiled platform, which can invoke procedures 130 and 140 directly.

It should be appreciated that the prologue 142 can written to handle the overhead associated with any interpreted language, some of which can require significant pre-invocation overhead. For example, Java methods, which are defined as synchronized or identified to catch and handle Java exceptions, the prologue 142 be complex.

For example, the prologue 142 can consist of several parts, such as a first part including mainly machine codes and a second part including code written in a high level compiled language. The first part can accept passed arguments in the execution context of the called procedure, allocate stack space require for procedure execution, then call the second part. The second part can perform actions for method synchronization and/or actions to catch exceptions. After the second part, execution can continue to stack frame construction of the Java method. Finally execution can pass to the interpreter code (body 144), which has fully initialized execution on context.

Figure 2:
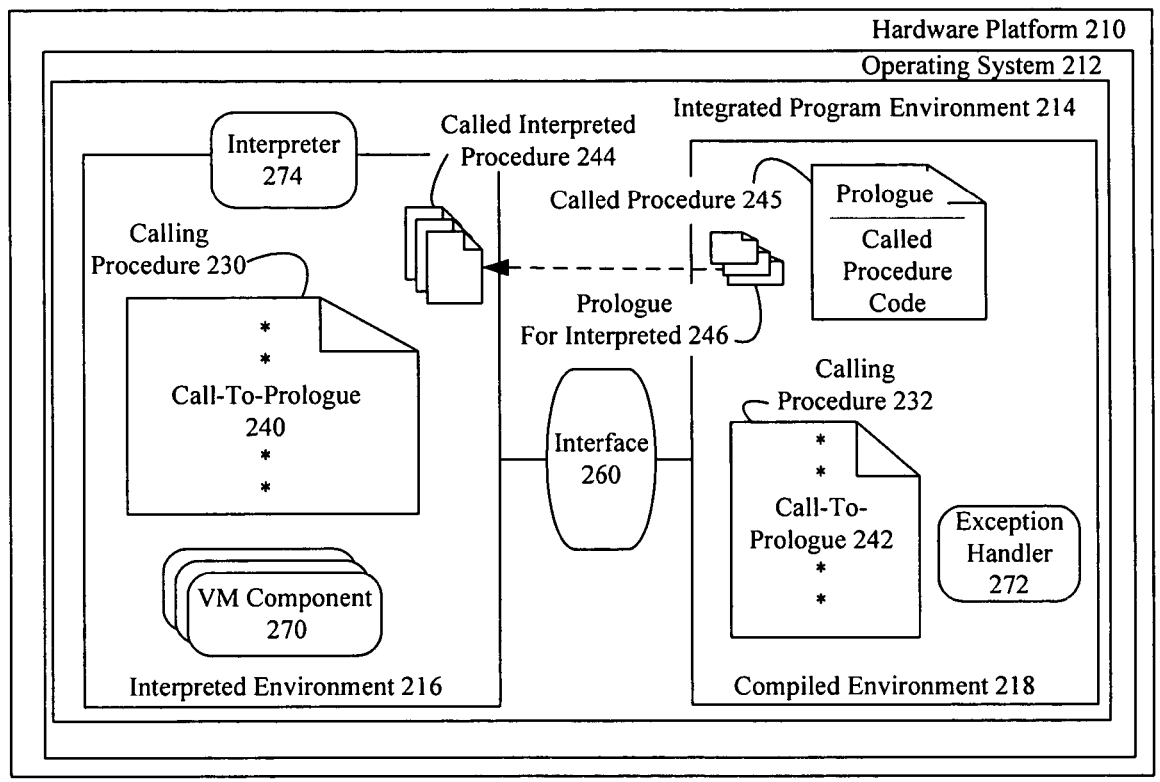
FIG. 2 is a schematic diagram illustrating a system in which a virtual machine and a compiled environment interact within an integrated environment in accordance with an embodiment of the inventive arrangements disclosed herein.
Figure 2:
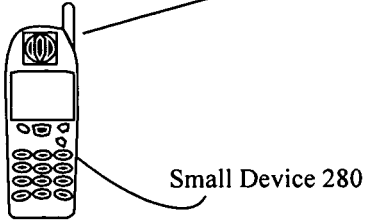

FIG. 2 is a schematic diagram of the system 200 that can be included in a small device 280, which can use the procedure invocation techniques described in system 100. That is, the system 200 can utilize a compiled prologue when invoking a called procedure associated with the compiled prologue. For example, when the called procedure 244 executes in an interpreted environment, the called procedure 244 can be invoked by placing a call to prologue 246, which includes machine code executing within the compiled environment 218. Similarly, when the called procedure 245 executes in the compiled environment 218, the called procedure 245 can be formed from a prologue and called procedure code, meaning the prologue and called procedure code, which are both machine code directly executable within the compiled environment 218, can be a single unified procedure. Like the prologue 246 that invokes an associated called interpreted procedure 244, the prologue within the called procedure 245 can be designed to invoke the called procedure code of the called procedure 245. Both the prologue 246 and the prologue within the called procedure 245 can be called by calling procedure 230 or calling procedure 232, as shown by call-to-prologue 240 and call-to-prologue 242, respectively.

The prologue (246 and the prologue in called procedure 245) can be a machine code conforming to the Application Binary Interface (ABI) specification of the target platform, which is used by compiled language environment 218 for compiled procedure calls. The prologue can be written using a prior knowledge of the called procedure (244 and the called procedure code in called procedure 245) that eliminates undesirable overhead. Accordingly, the prologue can invoke called procedures in a standardized fashion without sacrificing execution efficiency and without adding complications and overhead associated with "wrapping" procedure calls in a language agnostic wrapper.

The small device 280 presented in system 200 can include a mobile telephony device, a handheld computing device, a palmtop, an embedded computing device, or the like. In embodiments where the small device 280 is a resource constrained device, the program integration methodology detailed herein can provide an effective means for integrating platform independent code with highly efficient device specific code as needed.

For example, real time operations of mobile telephones, such as video teleconferencing and/or interactive game play, can require use of device specific hardware optimizations, and low-level efficient coding. The invention presented herein, however, is not to be limited to resource constrained devices and can be utilized with any computing device. Accordingly, the small device 280 can also include a desktop computer, a server, a distributed computing space, and the like without exceeding the scope of the inventive arrangements herein disclosed.

The small device 280 can have a standardized hardware platform 210. The hardware platform 210 can include a multitude of integrated components, such as a circuit board, a memory, a processor, an input mechanism, an output mechanism, a communication port, one or more peripheral devices, or the like. The hardware platform 210 can host an operating system 212.

The operating system 212 can be software that manages the computing resources of the hardware platform 210. The operating system 212 can control the execution of applications by performing such functions as scheduling, loading, initialing, and supervising the execution of programs, allocating storage, initiating and controlling input/output operations, handling errors, or the like. The operating system 212 can be a mobile telephone operating system, such as SYMBIAN OS, PDOS, RTOS, or the like. The operating system 212, is not limited to mobile telephone operating systems, however, and any operating system appropriate for the small device 280 can be used herein. For example, the operating system 212 can include PALM OS, WINDOWS CE, EMBEDDED LINUX, DOS, LINUX, UNIX, WINDOWS, and/or MACINTOSH OS. Together, the hardware platform 210 and operating system 212 can form a target platform, such as target platform 120 of FIG. 1.

An integrated program environment 214 can exist with the target platform. The integrated programming environment 214 can execute interpreted software written in one or more interpreted programming languages and can execute compiled software written in one or more compiled programming language.

Compiled software can refer to any machine-language program that is capable of being executed upon the small device 280. The compiled software can depend upon libraries and/or modules included within the compiled environment 218. More than one compiled environment 218, having a unique set of utilized interfaces, runtime libraries, and the like, can be part of the integrated program environment 214.

The interpreted software can refer to any interpreted code that is capable of executing within the interpreted environment 216. The interpreted environment 216 can include an associated interpreter 274 written for the operating system 212. The interpreted software can be written in a pure interpreted language as well as a pseudo-code (p-code) interpreted language. In one embodiment, the interpreted code segments can execute within a virtual machine. For example, the virtual machine can be a JAVA VIRTUAL MACHINE executing bytecode within the interpreted environment 216.

In another embodiment, the interpreted code segments can be executed in an interpreted environment 216 that does not require the virtual machine. In such an embodiment, the interpreted environment 216 can depend upon libraries, modules, routines, and the interpreter 274 that execute directly upon the integrated program environment 214. That is, the interpreted environment 216 need not be a self-contained operating environment isolated from other portions of the integrated program environment 214 and/or other portions of the operating system 212, as is the case with the virtual machine.

The interface 260 can be used for exchanging data between the interpreted environment 216 and the compiled environment 218. The interface 260 can include a series of software routines and development tools that permit low-level services and functions of an operating system, application, virtual machine, kernel, or the like to be utilized. For example, the interface 260 can provide a means to access behavior and state of classes, objects, and other VM components 270 of a virtual machine existing within the interpreted environment 216. The interface 260 can be an application program interface (API) or other software interface.

In one embodiment, the compiled environment 218 can include an exception handler 272. The exception handler 272 can be a software routine that reacts to specific types of exceptions during program execution. When the exception is for an error that an application can recover from, the application can resume running after the exception handler 272 has preformed specified programmatic actions. Advantageously, the prologue 246 can designate exceptions to be detected, "throw" the exceptions to be "caught" and handled by the exception handler 272. Accordingly, the exception handler 272 can be utilized to handle all detected exceptions, regardless of whether the exception occurs in the called procedure 244 executing in the virtual machine 216 or the called procedure 245 executing within the compiled environment 218.

In operation, each called procedure 244 and 245 can each have an associated prologue, generically shown as prologue 246 to illustrate that common techniques can be used to call procedures 245 and 244 since from an implementation perspective use of the prologue 246 can abstract the language in which a called procedure is written from a calling procedure. It should be noted, however, that each prologue 246 correlates to a specific one of the called procedures (244 or 245).

Calling procedure 230 and calling procedure 232 can each call the prologue 246 using call-to-prologue 240 and call-to-prologue 242, respectively. Consequently, the prologue 246 can be actuated from within interpreted environment 216 or from within compiled environment 218, resulting in the execution of the called procedure correlated with actuated prologue 246.

Figure 3:
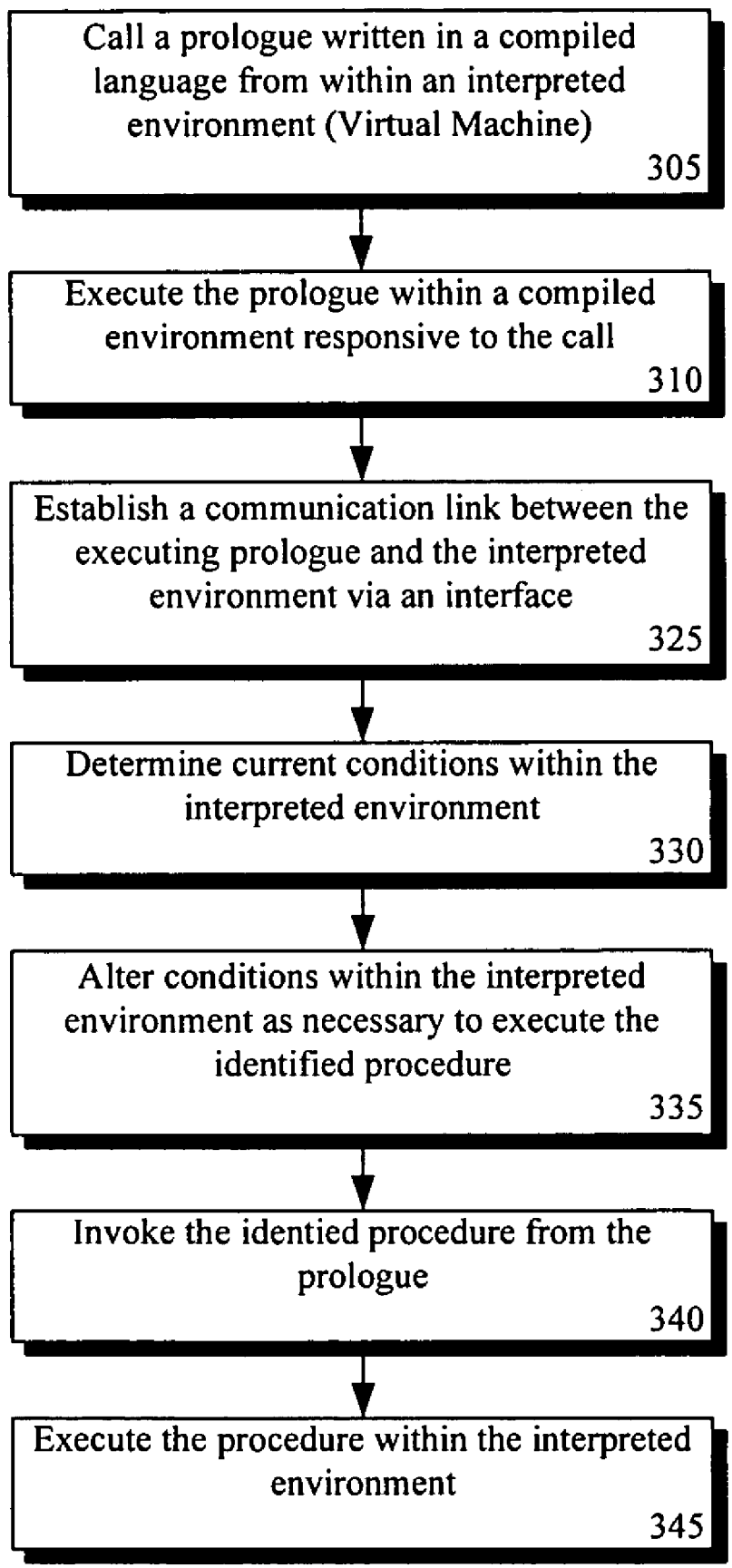
FIG. 3 is a flow chart of a method for invoking one interpreted procedure from another interpreted procedure through a compiled prologue in accordance with an embodiment of the inventive arrangements disclosed herein.

FIG. 3 is a flow chart of a method 300 for invoking one interpreted procedure from another interpreted procedure through a compiled prologue in accordance with an embodiment of the inventive arrangements disclosed herein. The method 300 can be performed in the context of an integrated program environment in which both the interpreted procedure and the compiled prologue can execute. The integrated environment can have a defined application binary interface (ABI). The prologue can invoke an associated interpreted procedure using calling conventions defined by the ABI. In one embodiment, the method 300 can be performed in the context of the system 200 of FIG. 2.

The method 300 can begin in step 305 where a prologue written in a compiled language can be called from within an interpreted environment. For example, a procedure executing within a virtual machine can trigger the prologue, which executes outside the virtual machine.

In step 310, the prologue can execute within a compiled environment responsive to the call. The compiled environment can be a hardware/software platform that the prologue was specifically compiled to execute upon. For example, the prologue can be written in the C programming language or derivative thereof and compiled to execute upon the LINUX operating system. The prologue can handle overhead for associated with called procedure, overhead that is a prerequisite before the called procedure can begin execution.

In step 325, a communication link can be established between the executing prologue and the interpreted environment. For example, a communication link can occur via a standardized interface, such as an application program interface (API). In step 330, the current conditions and/or state of the interpreted environment can be determined. In step 335, conditions within the interpreted environment can be altered as necessary to execute the identified procedure.

For example, in one embodiment the interpreted environment can be a virtual machine environment, such as a JAVA VIRTUAL MACHINE environment. In such an example, the prologue can allocate stack space within the virtual machine for local variables of the identified procedure. The prologue can also save register values associated with a routine that called the prologue. The prologue can initialize an activation frame within the virtual machine for the identified procedure. The prologue can further initialize a class within the virtual machine for the identified procedure as appropriate. Additionally, the prologue can initialize registers within the virtual machine. The prologue can also synchronize threads within the virtual machine. Any and all adjustments within the virtual machine necessary to invoke the called procedure from outside the virtual machine (or interpreted environment) can be performed.

In step 340, after the conditions of the interpreted environment have been altered, the identified or called procedure can be invoked from the prologue. In step 345, the invoked procedure can be executed within the interpreted environment.

The present invention can be realized in hardware, software, or a combination of hardware and software. A system according to an exemplary embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A machine-readable storage having stored thereon, a computer program having a plurality of code sections, the code sections executable by a machine for causing the machine to call an interpreted code body to execute on a target platform, the code sections comprising:
   at least one calling procedure;
   a called procedure comprising an interpreted code body, execution of the interpreted code body requiring use of an associated interpreter;
   a compiled prologue conforming to an application binary interface specifying calling conventions for an operating system and processor of the target platform and associated with the called procedure, said compiled prologue being invoked by the at least one calling procedure and responsively actuating said interpreted code body causing programmatic actions defined within the interpreted code body to execute, wherein execution of the compiled prologue does not require use of an interpreter;

wherein the interpreted code body of the called procedure executes upon the target platform having the application binary interface, wherein the compiled prologue actuates said interpreted code body according to specifications of the application binary interface by specifying aspects of procedure invocation including registers used for passing parameters, parameters to be passed upon a stack, constructing a stack frame for invoked procedures, and specifying return from executing the called procedure.

2. The machine-readable storage of claim 1, wherein the compiled prologue accepts arguments passed in an execution context of the called procedure from the at least one calling procedure and conveys the arguments to the interpreted code body.

3. The machine-readable storage of claim 1, wherein the prologue allocates stack space that is needed for the interpreted code body to execute.

4. The machine-readable storage of claim 1, wherein the prologue constructs an activation record including at least in part initializing and saving registers needed by the interpreted code body.

5. The machine-readable storage of claim 1, wherein the calling procedure and called procedure execute within a virtual machine, and wherein the compiled prologue executes outside the virtual machine.

6. The machine-readable storage of claim 1, wherein the language in which the called procedure is written is abstracted from the calling procedure such that the calling procedure does not know the language in which the called procedure is written.

7. The machine-readable storage of claim 1, wherein the interpreted code body executes within a JAVA VIRTUAL MACHINE.

8. The machine-readable storage of claim 7, wherein the interpreted code body comprises a synchronized JAVA method, and wherein the prologue performs at least one synchronization action in the calling procedure for the synchronized JAVA method.

9. The machine-readable storage of claim 7, wherein the prologue performs at least one action related to error handling such that exceptions thrown from native code or from java interpreted code are caught and handled in native code according to their type.

10. The machine-readable storage of claim 9, wherein the action causes errors generated during execution of the interpreted code body to be handled by an error handling mechanism remote from the JAVA VIRTUAL MACHINE.

11. The machine-readable storage of claim 7, wherein the interpreted code body does not include global variables and wherein states of execution threads within the JAVA VIRTUAL MACHINE associated with the called procedure and the at least one calling procedure is recorded within at least one of an execution stack and a plurality of registers that switch values in accordance with thread switches.

12. A machine-readable storage having stored thereon, a computer program having a plurality of code sections, the code sections executable by a machine for causing the machine to:

call a compiled program from a virtual machine using a compiled prologue that executes at least one programmatic action in a computing space outside the virtual machine as a result of the call to prepare calling conventions of an interpreted procedure in accordance with an application binary interface that is specific to an operating system and processor of a target platform hosting the virtual machine; and invoke the interpreted procedure within the virtual machine re at least one programmatic action, wherein before invoking the procedure, the at least one programmatic action alters the calling conventions to the interpreted procedure within the virtual machine to place the virtual machine in a state that permits the interpreted procedure to execute in accordance with the calling conventions of the application binary interface, wherein the at least one programmatic action conform to procedure invocation rules of the application binary interface established for the virtual machine.

13. The machine-readable storage of claim 12, wherein the calling conventions are altered by the compiled prologue prior to invoking the interpreted procedure and include:

allocating stack space within the virtual machine for local variables of the procedure;

saving register values associated with a routine that called the compiled program;

initializing a stack frame within the virtual machine for the procedure;

initializing a class within the virtual machine for the procedure; and initializing registers within the virtual machine for the procedure.

14. The machine readable storage of claim 12, the machine-readable storage further including code sections for causing the machine to:

handle errors that occur when the procedure executes within the virtual machine using an exception handler executing outside the virtual machine, wherein the at least one programmatic action initializes the exception handler for the procedure.

15. The machine readable storage of claim 12, wherein the machine is a mobile telephone, and wherein the code sections are executed by an operating system included within the mobile telephone.

* * * * *